United States Patent [19]

Fleischer

[11] 3,985,429
[45] Oct. 12, 1976

[54] STRENGTHENED, SHATTER-RESISTANT VEHICULAR MIRROR

[75] Inventor: Paul Fleischer, Holland, Mich.

[73] Assignee: Donnelly Mirrors, Inc., Holland, Mich.

[22] Filed: Feb. 6, 1975

[21] Appl. No.: 547,725

[52] U.S. Cl. .............................. 350/288; 350/310; 350/320
[51] Int. Cl.² .......................................... G02B 5/08
[58] Field of Search ........... 350/288, 310, 320, 165, 350/180; 427/206

[56] References Cited
UNITED STATES PATENTS

| 1,434,860 | 11/1922 | Taylor | 161/4 |
| 1,488,923 | 4/1924 | Hitchcock | 161/4 |
| 1,603,951 | 10/1926 | Hitchcock | 204/19 |
| 1,653,053 | 12/1927 | Lyndon | 228/66 |
| 2,352,923 | 7/1944 | Turner | 350/310 X |
| 3,391,895 | 7/1968 | Bausch et al. | 350/288 UX |
| 3,427,095 | 2/1969 | Dykema et al. | 350/288 |
| 3,489,484 | 1/1970 | Brown | 350/310 |
| 3,607,584 | 9/1971 | Becht | 161/4 |
| 3,708,218 | 1/1973 | Smillie | 350/61 |
| 3,776,618 | 12/1973 | Perison | 350/288 |
| 3,856,384 | 12/1974 | Kryzhanovsky | 350/288 X |

FOREIGN PATENTS OR APPLICATIONS

| 809,433 | 3/1937 | France |
| 852,209 | 1/1940 | France |
| 1,108,523 | 4/1968 | United Kingdom |

Primary Examiner—Ronald J. Stern
Assistant Examiner—F. L. Evans
Attorney, Agent, or Firm—Price, Heneveld, Huizenga & Cooper

[57] ABSTRACT

A strengthened, reinforced safety mirror especially adapted for use in interior rearview mirror assemblies in vehicles used in varying climates. The safety mirror has increased tensile strength and resistance against bending, breakage, and shattering as well as the ability to retain any glass fragments when broken. The mirror includes a reinforcing sheet means secured with adhering or bonding means to the rear surface of the glass mirror element. The reinforcing sheet means has a coefficient of thermal expansion matched to that of the glass to prevent differential expansion between the glass and the reinforcing sheet thereby assuring a secure bond between the same and preventing distortion of the glass in substantially all temperatures. The density of the reinforcing sheet is also preferably matched to the viscosity of the bonding means to further insure a secure bond and proper strength of the mirror.

31 Claims, 6 Drawing Figures

STRENGTHENED, SHATTER-RESISTANT VEHICULAR MIRROR

This invention relates to strengthened, shatter-resistant mirrors and, more particularly, to strengthened, shatter-resistant mirrors especially adapted for use in vehicles as rearview and other mirrors.

BACKGROUND OF THE INVENTION

Glass mirrors have long been used as vision-aiding devices in vehicles. It is well known that the typical glass used in such mirrors is very weak in tension, havng a relatively low tensile strength approximating 3,000 psi. Such low tensile strength has caused problems in producing adequately safe mirrors consistent with modern safety standards in the United States and other countries. For example, the normal inside rearview mirror in an automobile is positioned adjacent the upper portion of the windshield and may easily be struck by the head of a person within the automobile during an accident. Since the human head is generally spherical in shape, the impact of a head against the front of a mirror produces a spherical contact area placing the rear surface of the mirror in tension in both longitudinal and transversal or widthwise directions. Given the low tensile strength of the glass, the glass tends to fracture quite easily upon such impact. Various attempts have been made to overcome this problem such as by fully supporting the back of the mirror with plastics and other materials and the like.

Another problem in the design of safety mirrors is that of retaining and preventing the scattering of glass fragments from a mirror should the mirror be struck with an impact large enough to break it. Thus, gross fracture of the mirror must be prevented to avoid protruding, jagged mirror edges which could cause gross lacerations of a person's head upon impact. Various attempts have also been made to increase the shatter resistance of mirrors and to retain broken fragments.

Further, it is well known that automobiles and other vehicles including rearview mirrors are used in climates in various parts of the world having greatly differing temperature extremes. Typically, a mirror must be able to withstand and function without distortion of the visible image in the broad temperature range of −40° F. and up to approximately 250° F. (encountered in closed vehicles in hot climates). Accordingly, the problem of designing an adequate safety mirror which is distortion free, breakage and shatter resistant as well as fragment-scattering resistant has been hampered by the additional criterion that such mirrors must meet these criteria in extremes of temperatures.

SUMMARY OF THE INVENTION

Accordingly, it is an object and purpose of the present invention to provide a strengthened, shatter-resistant safety mirror which is especially designed for use in extremes of temperatures and in vehicles in which such temperatures are encountered. In order to resist breakage and shattering caused by the impact of the spherically shaped human head as well as by other objects during accidents, the tensile strength of the rear surface of the mirror glass is increased using a reinforcing sheet securely bonded or adhered to that rear surface. The reinforcing sheet, together with the adhering or bonding means securing the reinforcing sheet to the mirror cooperate to retain and prevent the scattering of any glass fragments should the mirror be broken upon impact. The mirror retains such increased strength and shatter and fragment-scattering resistance over the broad temperature range which must be encountered in vehicles by matching the coefficient of thermal expansion of the reinforcing sheet to that of the glass. Such matching of coefficients reduces differential expansion to a minimum resulting in a secure bond of the reinforcing sheet to the mirror and prevention of distortion of the mirror and image thereon in substantially all temperatures. The present safety mirror significantly increases the safety of occupants of a vehicle during accidents by reducing the chances of breakage of the mirror and preventing lacerations from broken and scattered glass should the mirror be broken.

In one aspect of the invention, the strengthened, reinforced safety mirror comprises a sheet of glass having a predetermined coefficient of thermal expansion and front and rear surfaces. A reflective coating means substantially covers one of the surfaces for reflecting light. A reinforcing sheet means generally coextensive with and generally parallel to the rear surface of the glass is laid thereagainst for strengthening and shatterproofing the glass sheet. The reinforcing sheet has a coefficient of thermal expansion generally matched to that of the glass sheet. Means are provided for adhering the reinforcing sheet means to the rear surface of the mirror whereby during either extreme heat or cold, the reinforcing sheet means and the adhering means together increase the tensile strength of the rear surface of the glass sheet and retain any fragments and pieces of said glass sheet should it be broken.

In other aspects of the invention, the reinforcing sheet means is a chemically inert, non-corrosive, mildew, and rot-resistant, flexible, resilient sheet of woven glass fibers. Groups of fibers forming strands or bundles extend either generallly longitudinally and widthwise of the glass or generally oblique to the length and width dimensions thereof. Further, the adhering means for the reinforcing sheet includes an adhesive paint or adhesive layer and/or a layer of polyvinyl chloride plastisol which permeates and interlocks with the reinforcing layer and is heated and cured to securely bond the reinforcing sheet to the mirror.

In another aspect of the invention, the density of the reinforcing sheet of woven fabric, namely, the closeness of the weave and the strand size thereof is matched to the viscosity of the plastisol. Such matching prevents entrapment of gases formed during the curing of the plastisol when bonding the reinforcing sheet to the glass thereby producing a secure bond such that the resultant mirror is properly reinforced and strengthened.

In yet another aspect of the invention, the strengthened, reinforced safety mirror may be combined with a mirror case to form a safety rearview mirror assembly.

These and other objects, advantages, purposes, and features of the invention will become more apparent from a study of the following description taken in conjunction with the drawings.

DESCRIPTION OF THE PREFERRED EMBODIMENT

Figure 1:
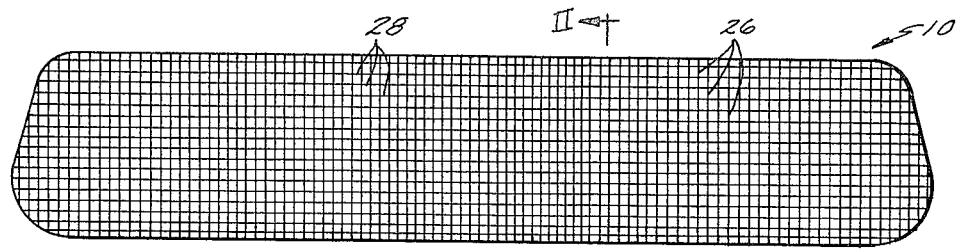
FIG. 1 is a rear plan view of one embodiment of the strengthened, shatter-resistant safety mirror.
Figure 2:
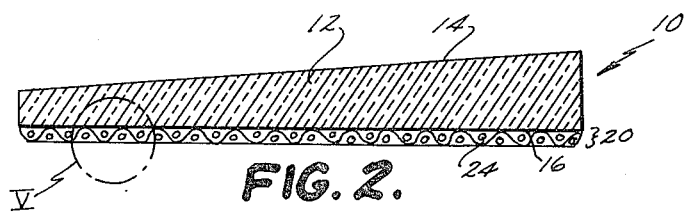
FIG. 2 is a sectional view of the safety mirror taken along plane II—II of FIG. 1.
Figure 5:
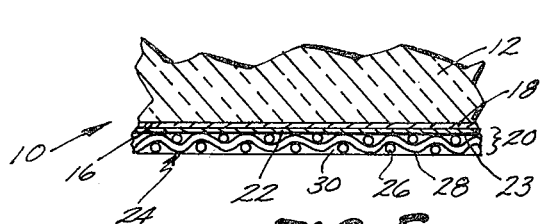
FIG. 5 is an enlarged, fragmentary, sectional view of area V of FIG. 2.

Referring to the drawings in greater detail, FIGS. 1, 2, and 5 illustrate one embodiment of the strengthened, shatter-resistant safety mirror 10 of the present invention. Mirror 10 includes an elongated sheet of glass 12 having generally planar front and rear surfaces 14 and 16, respectively, and having a length dimension greater than the transverse or width dimension. As shown in FIG. 2, the front and rear surfaces 14 and 16 may be nonparallel, in which case, the glass sheet is a prism designed for use in a mirror assembly shiftable between a full reflectivity day and a reduced reflectivity night position. The shape and size of the glass may be chosen to fit the desired type of mirror case or support.

Figure 6:
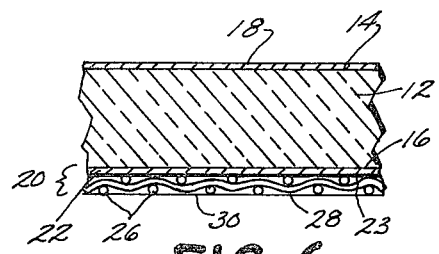
FIG. 6 is an enlarged, sectional, fragmentary view of yet another embodiment of the safety mirror.

The mirror 10 includes a layer 18 of metallic material or metallic alloy such as chromium, nickel-chromium, or the like covering substantially all of one surface of glass 12 and serving as a coating which reflects light. As shown in FIG. 5, the mirror may be a second surface mirror with reflective coating 18 located on the rear surface 16 of glass 12. As shown in FIG. 6, the reflective coating 18 may be located on the front surface 14 in which case the mirror is called a first surface mirror. The mirror 12 of FIG. 6 has parallel front and rear surfaces 14, 16. Of course, the present strengthening, reinforcing invention is applicable to all types of mirrors including non-prismatic, second surface mirrors having parallel front and rear surfaces. Typically, although not necessarily, automobile and other vehicular mirrors are second surface mirrors since such mirrors are more scratch and mar resistant.

As is best seen in FIGS. 2 and 5, the means for increasing the strength and shatter resistance of embodiment 10 of the safety mirror are shown generally at 20. The mirror includes a thin layer of adhesive primer paint 22 applied over reflective coating 18 followed by a reinforcing sheet 24 comprising a single layer or sheet of woven fabric having strands or bundles of fibers or filaments 26 and 28 running transversely of one another. The reinforcing sheet is permeated with and securely bonded as closely as possible to the actual rear surface of the mirror glass 12 by a bonding agent layer 30 of polyvinyl chloride plastisol. The liquid plastisol is flowed over and through the reinforcing fabric at substantially all portions of the rear of the mirror. Thereafter, the PVC plastisol is heated and cured to form a flexible, resilient layer of PVC including therewithin the reinforcing fabric 24. A heat-activated adhesive in primer layer 22 along with the PVC securely bond and adhere the woven fabric to the rear of the mirror. A suitable primer paint which comprises a heat-sensitive adhesive including a pigment for hiding the reflective layer on the mirror and useful for layer 22 is product No. A1103B produced by B.F. Goodrich Chemical Company of Cleveland, Ohio.

After application of the various strengthening layers, the mirror element and layers are cured by heating to a temperature of approximately 350° F. At approximately this temperature, the PVC plastisol is chemically converted to polyvinyl chloride. Sufficient plasticizer is originally included in the plastisol to leave the cured layer inherently resilient and impressionable at all temperatures to which vehicles including such mirrors are normally subjected —namely, temperatures from approximately −40° F. to approximately 250° F. (inside a closed vehicle during the summer). Although application of the PVC layer is preferably done in plastisol form, PVC in nonplastisol form may be injection molded onto the back of the mirror. A suitable polyvinyl chloride plastisol found useful in the present invention is product No. 370-808 produced by B.F. Goodrich Chemical Company. This plastisol has a viscosity of 1,000 centipoise at 80° F. and a specific gravity of 1.14. Other materials having the above characteristics of resiliency and flexibility over a wide temperature range may also be used for layer 30 including polyvinyl acetate, polyurethane, silicone sealants, and others.

Figure 3:
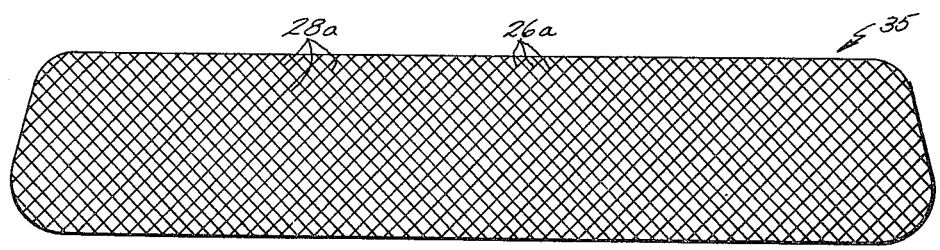
FIG. 3 is a rear plan view of another embodiment of the safety mirror.

As shown in FIGS. 1 and 3, the woven fabric reinforcing sheet is cut and sized to be substantially coextensive with the entirety of the rear surface of the mirror. A particular feature of the invention is that the woven fabric includes woven strands or bundles 26 and 28 of fibers extending generally transversely of or generally at right angles to one another. In embodiment 10 of the safety mirror, one set of strands 26 run generally along the lengthwise dimension of the elongated glass sheet while a transverse set of strands 28 run generally along the widthwise or transverse dimension of that glass. It is preferred that in this embodiment the respective strands 26 and 28 be as closely parallel to the length and width dimensions respectively as is possible. However, as shown in embodiment 35 of the mirror in FIG. 3, the reinforcing woven fabric may also be cut to locate the strands generally oblique to the length and widthwise dimensions of the elongated glass. Accordingly, in embodiment 35, strands 26a run generally diagonally while strands 28a also run diagonally but transverse or at right angles to strands 26a.

In any form, with the strands running either generally along or parallel to the length and width dimensions or oblique to those dimensions, the reinforcing fabric bonded to the back of the mirror increases the tensile strength of the rear surface of the glass by resisting bending stresses in the directions of both sets of strands thereby resisting breakage of the mirror especially when the mirror is impacted by a spherical object such as the head of a person within a vehicle. The back surface and thus, the entire mirror are restrained from bending thereby increasing breakage resistance.

Another important aspect of the invention is the fact that the reinforcing woven fabric is selected to have a coefficient of thermal expansion matching that of the glass sheet 12. Suitable fabric is fiberglass cloth having strands of fibers of glass running transversely to one another as mentioned above. Each of the strands is a bundle of individual glass fibers or filaments wound together. The glass sheet is soda-lime glass and has a coefficient of thermal expansion approximately within the range of about 0.92 to $1.03 \times 10^{-5}$ inches per inch degree Centigrade (1.66 to $1.85 \times 10^{-5}$/° Fahrenheit) while each of the individual glass filaments of the fiberglass cloth has a coefficient of thermal expansion of approximately $1.60 \times 10^{-6}$ inch per inch per degree Fahrenheit ($3.29 \times 10^{-5}$/° Centigrade) in the longitudinal direction, i.e., parallel to its axis of elongation, and approximately $2.8 \times 10^{-6}$ inch per inch per degree Fahrenheit ($3.36 \times 10^{-5}/°$ Centigrade) in the transverse direction, i.e., transverse to the axis of elongation. One suitable fiberglass cloth is that manufactured by Burlington Glass Fabrics, New York City, New York, having product number 1951-38.

The matching and approximate equivalence of the coefficients of expansion prevents a differential expansion between the reinforcing sheet 24 and glass sheet 12. Since both expand or contract similarly and at approximately the same rate, no stress or strain is produced which would otherwise distort or bend the mirror glass or loosen or prevent the reinforcing sheet from remaining either substantially coextensive with the mirror back or properly adhered to the mirror.

Since the greatest expansion of the glass sheet occurs along its greatest or lengthwise dimension, it is also preferable that the coefficients of expansion be matched along the lengthwise or longitudinal dimensions of the glass and the fibers included in reinforcing sheets. Thus, at least some of the strands or bundles including the fibers should extend in their lengthwise dimension along or at an angle to the lengthwise dimension of the glass sheet as shown in FIGS. 1 and 2.

The adhesive and PVC layers are sufficiently resilient and elastic to accommodate any differential expansion or contraction between themselves and the glass sheet or reinforcing sheet means resulting from a difference between their coefficients of thermal expansion and those of the said other portions of the safety mirror. The reinforcing sheet is, therefore, securely retained in place against the mirror back in all temperatures.

Although woven fiberglass fabric is preferable, other reinforcing sheet means may be used as long as the coefficient of thermal expansion is matched to that of the glass. Also, such other equivalent reinforcing means should have the ability to resist expansion or tensile strength in transverse directions as does the preferable woven fabric in order to increase the tensile strength of the glass and resist breakage thereof. Further, the fibers and filaments of the woven fabric reinforcing sheet means are preferably formed from materials which are chemically inert, noncorrosive, mildew and rot resistant, as well as being flexible, resilient, and stretch resistant. Thus, the increased strength of the present mirror is not diminished by salt-containing sea air, moisture, or the like to which many vehicles are typically exposed. The fiberglass filaments used in the preferred fabric herein meet all of these requirements. Other materials also meeting these requirements could also be used.

Should it be desired to increase the strength of the first surface type of glass mirror, a preferred form of the strengthening means may be adhered or bonded directly to the back of the glass sheet. As shown in FIG. 6, a layer of adhesive primer paint 22 is coated on the rear surface 16 of the glass 12 followed by a single layer of reinforcing woven fabric 24 including filaments 26 and 28. The fabric is permeated and covered by a layer of plastisol of polyvinyl chloride which is thereafter heated and cured as mentioned above to form a PVC layer. The PVC layer includes and bonds the reinforcing fabric to the rear surface of the glass with the help of the heat-sensitive adhesive in the primer 22.

Alternatively, with the embodiments shown in either FIG. 5 or FIG. 6, additional bonding and adherent strength may be obtained to retain the reinforcing fabric against the rear of the mirror by utilizing an additional layer 23 of bonding agent or adhesive beneath the plastisol or PVC layer including the reinforcing fabric. A suitable heat-sensitive adhesive for use in layer 23 is product No. J1199-Part B produced by Armstrong Cork Company of Cincinnati, Ohio.

It has also been found preferable to match the density of the woven fabric reinforcing sheet to the viscosity of the bonding agent which retains the reinforcing fabric against the rear of the mirror. When the fabric density is too high, i.e., there is too close a weave without sufficient space between the strands of fibers of the fabric, gas bubbles formed during the curing of the plastisol and other bonding agent layers by heating, as well as any air trapped between the mirror and reinforcing fabric and plastisol layers during assembly, cannot escape through the fabric to the surface of the plastisol layer. Accordingly, such entrapped gas bubbles prevent a secure bonding of the reinforcing sheet to the mirror because the plastisol layer, which would otherwise permeate the reinforcement sheet and substantially continuously contact the mirror back, is prevented from doing so by the presence of the gas bubbles. It has also been found that the reinforced mirror is actually stronger with a sufficiently loose weave fabric because it allows such escape of entrapped gases resulting in a secure bond. This is opposite the logical principle which would otherwise predict that less strength would occur with a looser weave. However, when the fabric density or weave is reduced to too few fibers in the cloth, the resultant strength of the reinforced mirror will be accordingly reduced from its optimum strength because of the presence of the fewer number of fibers. Also, the viscosity of the plastisol or other bonding agent flowed and permeated through the reinforcing sheet is important. Too great a viscosity bonding agent would not permeate the woven fabric in the required manner. On the other hand, a bonding agent having too small a viscosity would not allow retention of the bonding agent on the mirror prior to and during the curing process.

Accordingly, a correctly matched fabric weave or density and plastisol or bonding agent viscosity is important to the resulting strength of the reinforced mirror herein. One combination which has been found suitable and resulted in the requisite reinforced strength in the completed product is that using the plastisol and reinforcing sheet mentioned above. Thus, the preferable plastisol is having a viscosity of 1,000 centipoise at 80° F. Its specific gravity is 1.14. A suitable fabric density is that of 18 ends per inch in the warp direction and 14 picks per inch in the cross direction. Each strand or bundle of fibers has a thickness of 0.025 inches. The fabric weighs 8.6 ounces per square yard. Such a fabric is product No. 1951-38 produced by the above-mentioned Burlington Glass Fabrics Company, New York City, New York. The positioning of the warp or cross direction of the fabric along the longitudinal dimension of the mirror does not seem to effect the resultant strength. Of course, should either the fabric density or viscosity of one of the two above-mentioned elements be changed, the other element would require a corresponding change.

Figure 4:
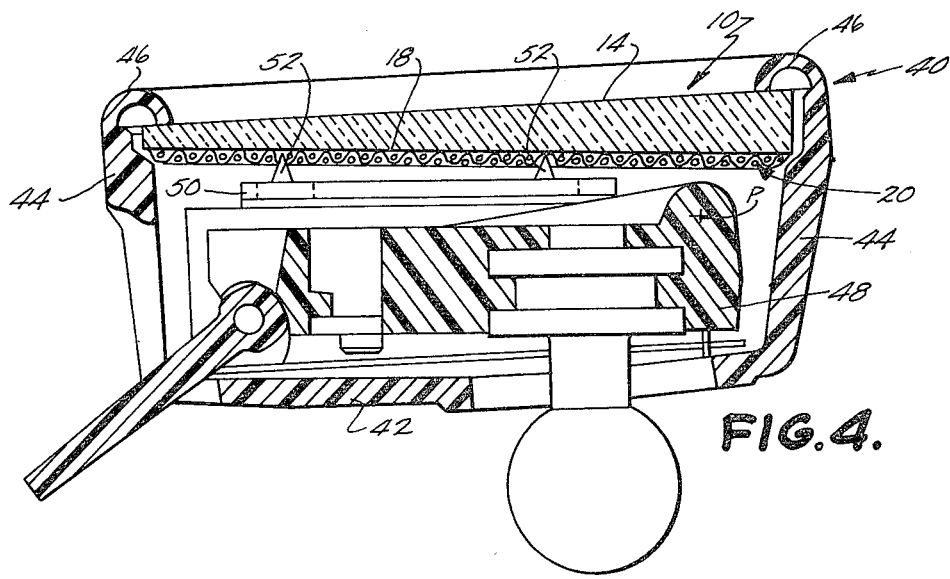
FIG. 4 is an enlarged, sectional view of the safety mirror assembled together with a rearview mirror case of the type designed for use interior of a vehicle.

Referring to FIG. 4, the typical installation for the safety mirror is shown. In this assembly, the prismatic safety mirror embodiment 10 having a second surface reflective layer 18 and strengthening means 20 as shown in FIG. 5 is used. Preferably, the mirror case 40 housing the safety mirror 10 is of the type described in detail in copending United States patent application Ser. No. 356,074 entitled HOLLOW BACK MIRROR CASE AND EDGE-FORMING METHOD THEREFOR, filed May 1, 1973, by Arthur W. Kurz, Jr. and Harold R. Wilson, the disclosure and teachings of which are incorporated by reference herein. Case 40 includes a case back 42, upstanding side walls 44 extending around the periphery of the back 42 and outwardly therefrom, and a peripheral securing means such as a semi-circular rolled lip 46 having a peripheral expansion space therewithin to allow thermal expansion of the mirror element. The case back 42 is spaced from the rear surface of the mirror element 10 a sufficient distance to provide room for mounting a pivotable mirror actuator 48 which may be used to shift the case and mirror element between a full reflectivity day position in which rays of light are reflected by the reflective layer 18 and a reduced-reflectivity night position in which rays of light are reflected off the front surface 14 of the safety mirror. The mirror case and element are pivoted as a unit about pivot point P by the actuator 48.

The mirror case also includes internal support members 50 which may secure the actuator within the case as well as support portions of the rear of the mirror element. At least some of the support members include tapered or pointed ribs or projections 52 which are at least partially inserted into the flexible, resilient, impressionable plastisol layer 30. The inserted ribs thereby prevent a shift in position or vibration of the mirror element 10 within the case 40.

The present invention thus provides a strengthened distortion free, shatter and breakage resistant and fragment-retaining safety mirror especially useful in automobile and other vehicle environments to prevent injury from the mirror in case of accident. The safety mirror may be mounted in suitable mirror cases to form rearview mirror assemblies and retain its increased strength, distortion resistance, and shatter resistance even in extremes of temperatures.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are defined as follows:

1. A strengthened, reinforced safety mirror comprisinng a sheet of glass having a predetermined coefficient of thermal expansion and front and rear surfaces; reflective coating means substantially covering one of said surfaces for reflecting light; reinforcing sheet means laid substantially against and being generally coextensive with the rear surface of said mirror for strengthening and shatterproofing said glass sheet, said reinforcing sheet means having a coefficient of thermal expansion generally matched to that of said glass sheet and means for allowing an elastic bonding means to permeate said sheet means and adhere said sheet means to said mirror; and resilient, elastic bonding means permeating said reinforcing sheet means and forming a layer including said reinforcing sheet means therewithin for adhering said reinforcing sheet means to said mirror whereby during exposure to normal temperatures or either extreme heat or cold, said reinforcing sheet means and said resilient, elastic bonding means together increase the tensile strength of said rear surface of said glass sheet and retain any fragments and pieces of said glass should it be broken.

2. The safety mirror of claim 1 wherein said glass sheet is generally elongated having a length dimension greater than its width dimension; said reinforcing sheet means including a layer of fabric having first and second woven strands of fibers extending generally transversely of one another, said first strands extending generally along the length dimension of said glass sheet while said second strands extend generally across said width dimension of said glass sheet.

3. The safety mirror of claim 2 wherein said first strands extend parallel to said length dimension of said glass sheet; said second strands extending parallel to said width dimension thereof.

4. The safety mirror of claim 2 wherein said strands comprise bundles of inert, noncorrosive, rot and mildew resistant, flexible, stretch resistant, glass filaments.

5. The safety mirror of claim 4 wherein said glass sheet has a coefficient of thermal expansion between about 1.66 and $1.85 \times 10^{-5}$ inches/° F.; said glass filaments of said reinforcing sheet means having a coefficient of thermal expansion in their length dimension of about $1.60 \times 10^{-6}$ inch/inch° F. and about $2.8 \times 10^{-6}$ inch/inch/° F. in their transverse dimension.

6. The safety mirror of claim 1 wherein said glass sheet is generally elongated having a length dimension greater than its width dimension; said reinforcing sheet means including a layer of fabric having first and second woven strands of fibers extending generally transversely of one another, said first and second strands extending obliquely to said length and width dimensions, respectively.

7. The safety mirror of claim 6 wherein said strands comprise bundles of inert, noncorrosive, rot and mildew resistant, flexible, stretch resistant, glass filaments.

8. The safety mirror of claim 1 wherein said glass sheet is a prism having nonparallel, generally planar front and rear surfaces.

9. The safety mirror of claim 1 wherein said glass sheet is non-prismatic and has generally parallel and generally planar front and rear surfaces.

10. The safety mirror of claim 1 wherein said bonding means includes a heat curable plastisol of polyvinyl chloride flowed over and through said reinforcing sheet means after the same is laid on said mirror and heated and cured such that said reinforcing sheet means is securely bonded to said rear surface of said mirror.

11. The safety mirror of claim 10 wherein said reflective coating means includes a thin layer of reflective metallic material adhered to said rear surface of said glass sheet and a layer of adhesive paint applied over said metallic layer to seal and preserve the same and to help bond said reinforcing sheet means and plastisol layer to said metallic layer and glass sheet.

12. The safety mirror of claim 1 wherein said reflective coating means covers said rear surface of said glass sheet and is interposed between said rear surface and said reinforcing sheet means and bonding means.

13. A strengthened, reinforced safety mirror comprising a sheet of glass having a predetermined coefficient of thermal expansion and front and rear surfaces; reflective coating means covering one of said surfaces for reflecting light; and reinforcing sheet means generally coextensive with, generally parallel to, and lying against and adhered to said rear surface of said mirror for strengthening and shatterproofing said glass sheet, said reinforcing sheet means having a coefficient of thermal expansion generally matched to that of said glass sheet; resilient, elastic means at least partially including said reinforcing sheet means for adhering said reinforcing sheet means to said rear surface of said mirror whereby during normal temperatures or either extreme heat or cold, said reinforcing sheet means and resilient, elastic adhering means together increase the tensile strength of said rear surface of said glass sheet and retain any fragments and pieces of said glass sheet should it be broken.

14. The safety mirror of claim 13 wherein said reflective coating means includes a layer of reflective metallic material adhered to said rear surface of said glass sheet; said adhering means including a layer of adhesive paint applied over said metallic layer to seal and preserve the same and to bond said reinforcing sheet means to said metallic layer and glass sheet.

15. The safety mirror of claim 14 wherein said glass sheet is generally elongated having a length dimension greater than its width dimension; said reinforcing sheet means including a layer of fabric having first and second woven strands of fibers extending generally transversely of one another, said first strands extending generally along the length dimension of said glass while said second strands extend generally across said width dimension of said glass sheet.

16. The safety mirror of claim 15 wherein said adhering means includes a layer of flexible, resilient polyvinyl chloride permeating and including therewithin said reinforcing sheet and bonded to said reflective coating means.

17. The safety mirror of claim 16 including an additional layer of adhesive between said layer of adhesive paint and said layer of polyvinyl chloride.

18. The safety mirror of claim 13 wherein said adhering means includes a layer of flexible, resilient polyvinyl chloride permeating and including therewithin said reinforcing sheet, and bonded to said glass sheet, said polyvinyl chloride being applied as a plastisol and heated to cure the same thereby helping to bond said reinforcing sheet means to said reflective coating means and glass sheet.

19. The safety mirror of claim 13 wherein said glass sheet is generally elongated having a length dimension greater than its width dimension; said reinforcing sheet means including a layer of fabric having first and second woven strands extending generally transversely of one another, said first strands extending generally along the length dimension of said glass sheet while said second strands extend generally across said width dimension of said glass sheet.

20. The safety mirror of claim 19 wherein said strands comprise bundles of inert, noncorrosive, rot and mildew resistant, flexible, stretch resistant, glass filaments.

21. The safety mirror of claim 20 wherein said glass sheet has a coefficient of thermal expansion between about 1.66 and $1.85 \times 10^{-5}$ inches/° F.; said glass filaments of said reinforcing sheet means having a coefficient of thermal expansion in their length dimension of about $1.60 \times 10^{-6}$ inch/inch° F. and about $2.8 \times 10^{-6}$ inch/inch/° F. in their transverse dimension.

22. The safety mirror of claim 13 wherein said glass sheet is a prism having nonparallel, generally planar front and rear surfaces.

23. The safety mirror of claim 13 wherein said reflective coating means covers said rear surface of said glass sheet and is interposed between said rear surface and said reinforcing sheet means and adhering means.

24. A strengthened, reinforced safety mirror comprising a sheet of glass having front and rear surfaces; relative coating means substantially covering one of said surfaces for reflecting light; reinforcing sheet means laid substantially against and being generally coextensive with the rear surface of said mirror for strengthening and shatterproofing said glass sheet, said reinforcing sheet means including a layer of fabric having first and second woven strands extending generally transversely of one another, said woven fabric having a predetermined fabric density including a predetermined number of strands per square inch; and resilient, elastic bonding means permeating said reinforcing sheet means and forming a layer including said reinforcing sheet means therewithin for adhering said reinforcing sheet means to said mirror; said bonding means including a bonding agent flowed over said reinforcing woven fabric and thereafter cured by heating into said resilient, elastic layer, said bonding agent having a predetermined viscosity to thoroughly permeate said fabric and engage said mirror rear surface; said bonding agent viscosity and fabric density being chosen and matched to allow escape of any trapped gas bubbles formed during assembly of said mirror or curing of said bonding agent such that said layer is securely and substantially continuously adhered to substantially the entire rear surface of said mirror whereby said reinforcing sheet means and said resilient, elastic bonding means together increase the tensile strength of said rear surface of said glass sheet and retain any fragments and pieces of said glass should it be broken.

25. The safety mirror of claim 24 wherein said bonding agent is a plastisol of polyvinyl chloride having a viscosity of 1,000 centipoise at 80° F.; said woven fabric having a plurality of strands of glass filaments woven together and a fabric density of 18 ends per inch in the warp direction, 14 picks per inch in the cross direction, each strand of filaments having a thickness of about 0.025 inches.

26. The safety mirror of claim 25 wherein said woven fabric has a coefficient of thermal expansion generally matched to that of said glass sheet.

27. In a safety rearview mirror assembly for vehicles of the type including a mirror case having a back, peripheral walls extending outwardly from the back, a glass mirror element having a reflective coating on one surface thereof received within said side walls, and peripheral securing means for holding said element in said case, said case including means for supporting at least a portion of the rear surface of said mirror element, the improvement comprising: a strengthened, reinforced mirror element comprising a sheet of glass having a predetermined coefficient of thermal expansion and front and rear surfaces; reflective coating means covering one of said surfaces for reflective light; and reinforcing sheet means generally coextensive with, generally parallel to, and lying against and adhered to said rear surface of said mirror element for strengthening and shatterproofing said glass sheet, said reinforcing sheet means having a coefficient of thermal expansion generally matched to that of said glass sheet; resilient, elastic means at least partially including said reinforcing sheet means for adhering said reinforcing sheet means to said rear surface of said mirror element whereby during normal temperatures or either extreme heat or cold, said reinforcing sheet means and resilient, elastic adhering means together increase the tensile strength of said rear surface of said glass sheet and retain any fragments and pieces of said glass sheet should be broken.

28. The safety rearview mirror assembly of claim 27 wherein said glass sheet is generally elongated having a length dimension greater than its width dimension; said reinforcing sheet means including a layer of fabric having first and second woven strands of fibers extending generally transversely of one another, said first strands extending generally along the length dimension of said glass sheet while said second strands extend generally across said width dimension of said glass sheet.

29. The safety rearview mirror assembly of claim 28 wherein said adhering means includes a layer of flexible, resilient polyvinyl chloride permeating and including therewithin said reinforcing sheet and bonded to said reflective coating means, said polyvinyl chloride being applied as a plastisol and heated to cure the same thereby helping to bond said reinforcing sheet means to said reflective coating means and glass sheet.

30. The safety rearview mirror assembly of claim 29 wherein said reflective coating means includes a thin layer of reflective metallic material adhered to said rear surface of said glass sheet and a layer of adhesive paint applied over said metallic layer to seal and preserve the same and to help bond said reinforcing sheet means and layer of polyvinyl chloride to said metallic layer and glass sheet.

31. The safety rearview mirror assembly of claim 29 wherein said means for supporting said rear surface of said mirror element in said mirror case include upstanding support members extending toward said rear surface of said mirror element from said case back, said support members being at least partially inserted in said layer of flexible, resilient chloride to prevent shifting of said mirror element in said mirror case.

* * * * *

UNITED STATES PATENT AND TRADEMARK OFFICE
CERTIFICATE OF CORRECTION

PATENT NO. : 3,985,429
DATED : October 12, 1976
INVENTOR(S) : Paul Fleischer

It is certified that error appears in the above-identified patent and that said Letters Patent are hereby corrected as shown below:

Column 8, line 26;

"$1.60 \times 10^{-6}$ inch/inch° F." should be --$1.60 \times 10^{-6}$ inch/inch/° F.--;

Column 9, line 64;

"$1.60 \times 10^{-6}$ inch/inch° F." should be --$1.60 \times 10^{-6}$ inch/inch/° F.--;

Column 10, line 7;

"relative" should be --reflective--;

Column 12, line 19;

After "resilient" insert --polyvinyl--.

Signed and Sealed this

Fifteenth Day of February 1977

[SEAL]

Attest:

RUTH C. MASON
*Attesting Officer*

C. MARSHALL DANN
*Commissioner of Patents and Trademarks*